(12) United States Patent
Kharod

(10) Patent No.: US 6,764,122 B2
(45) Date of Patent: Jul. 20, 2004

(54) VEHICLE END GATE HINGE CUP

(75) Inventor: Ajay Mahesh Kharod, Rochester Hills, MI (US)

(73) Assignee: General Motors Corporation, Detroit, MI (US)

(*) Notice: Subject to any disclaimer, the term of this patent is extended or adjusted under 35 U.S.C. 154(b) by 67 days.

(21) Appl. No.: 10/286,525

(22) Filed: Nov. 1, 2002

(65) Prior Publication Data

US 2004/0113448 A1 Jun. 17, 2004

(51) Int. Cl.[7] .............................................. B60P 1/267
(52) U.S. Cl. ................... 296/50; 296/57.1; 296/146.11; 296/53
(58) Field of Search ....................... 296/50, 57.1, 146.11

(56) References Cited

U.S. PATENT DOCUMENTS

| | | | | |
|---|---|---|---|---|
| 3,895,838 A | * | 7/1975 | Hamada | |
| 5,358,301 A | * | 10/1994 | Konchan et al. | |
| 5,813,163 A | * | 9/1998 | Dysarz | |
| 5,988,724 A | * | 11/1999 | Wolda | |
| 6,209,147 B1 | * | 4/2001 | Wheaton | |
| 2002/0167188 A1 | * | 11/2002 | Zagaroff | |

* cited by examiner

Primary Examiner—Kiran Patel
(74) Attorney, Agent, or Firm—Laura C. Hargitt

(57) ABSTRACT

A hinge cup is adapted to be installed on an outer surface of a vehicle end gate. The hinge cup includes a hinge cup body constructed of a polymer material. The hinge cup body is attached to a surface of the vehicle end gate and has an outer surface that is operable to cooperate with a trunnion member extending outwardly from an end gate mounting location on a vehicle body. The hinge cup body cooperates with the trunnion member when the end gate is placed adjacent the end gate mounting location on the vehicle body.

14 Claims, 4 Drawing Sheets

VEHICLE END GATE HINGE CUP

BACKGROUND OF THE INVENTION

The present invention relates generally to vehicle end gates and, in particular, to a vehicle end gate hinge cup.

Hinge cups, which are utilized in vehicle end gates to receive a trunnion attached to and extending outwardly from an outer portion of the vehicle body, are well known. The traditional prior art vehicle end gate is a door extending across the width of the vehicle and hinged at a side edge near the bottom thereof, which can be latched to the sides of a vehicle storage area, such as a pickup box or a vehicle interior, in a vertical position. The end gate is operable to be unlatched to swing about the hinge cup from the vertical position to a horizontal position that is approximately coplanar with an interior surface of the vehicle storage area. Prior art end gate hinge cups are constructed of metal, such as steel, brass, bronze, or the like and formed in a cup shape using a well-known hobbing process. The formed cup is then brazed and welded on an assembly bracket, forming a two-piece assembly. The assembly bracket and hinge cup are then mounted on the vehicle end gate and the hinge cup is used to engage with the trunnion at an end gate mounting location when the end gate is attached to the vehicle body.

The hobbing process, however, disadvantageously adds to variation in positional tolerances on centering the cup in welding process, limits the ability of the hinge cups to hold internal dimensions. The metallic material of the prior art hinge cup is also subject to excessive wear after the vehicle end gate has been removed and reinstalled a number of times, which loosens the flats on the interior surface of the hinge cup and eventually causes a chucking and alignment issue.

In addition, the prior art hinge cup disadvantageously has no adjustability for improving latching efforts. The design of the prior art hinge cup is over constrained in the vertical and the horizontal positions of the end gate and does not have any anti rotation features, which allows the hinge cup to rotate if excessive wear has occurred to the hinge cup.

It is desirable, therefore, to provide a hinge cup for a vehicle end gate that holds internal dimensions after being formed, is resistant to wear and has an antirotation feature.

SUMMARY OF THE INVENTION

The present invention concerns a hinge cup adapted to be installed on an outer surface of a vehicle end gate. The hinge cup includes a hinge cup body that is preferably constructed of a polymer material. The hinge cup body is attached to a surface of a vehicle end gate and has an outer surface that is operable to cooperate with a trunnion member extending outwardly from an end gate mounting location on a vehicle body. The hinge cup body cooperates with the trunnion member when the end gate is placed adjacent the end gate mounting location on the vehicle body.

The hinge cup body is preferably constructed of a polymer material, such as Nylon 4–6 or a similar high strength polymer that has high compressive strength, excellent high and low temperature performance, and oil resistance properties. The hinge cup body includes a bracket portion that is integral with a cup portion. The cup portion extends upwardly from the bracket portion and defines an aperture that is adapted to receive the trunnion member that extends from the vehicle body. The aperture is also adapted to receive a fastener for attaching the hinge cup to the outer surface of the vehicle end gate and for preventing rotation of the hinge cup when the vehicle end gate is attached and removed from the vehicle body. The bracket portion includes two wing portions extending outwardly from the cup portion. Each wing portion includes a mounting aperture extending therethrough for receiving a fastener for mounting the hinge cup to the outer surface of the vehicle end gate.

The hinge cup in accordance with the present invention is preferably constructed of an injection molded high strength polymer such as Nylon 4–6 or the like, which provides functions including, but not limited to, excellent lubricity and a very low frictional coefficient. The high strength polymer provides high compressive strength, which is needed for bearing surfaces, as well as excellent high and low temperature performance and oil resistance. The high strength polymer also has an excellent ability to hold inside dimensions, and has ultraviolet stability.

The hinge cup in accordance with the present invention also advantageously provides a single piece design with molded details, a center pin or bolt received by the cup portion to provide anti rotation and one or two fasteners to fasten the bracket portion to the vehicle end gate. The single piece design of the hinge cup advantageously eliminates the construction variation of the prior art due to brazing, springback on stamping, and forming of the metallic material of the prior art hinge cup. The hinge cup in accordance with the present invention also provides isolation from the trunnion preventing chucking, improved closing efforts for the vehicle end gate, and the ability to engage more surface area to the trunnion, which provides a greater ability to adjust engagement of the vehicle end gate and trunnion.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
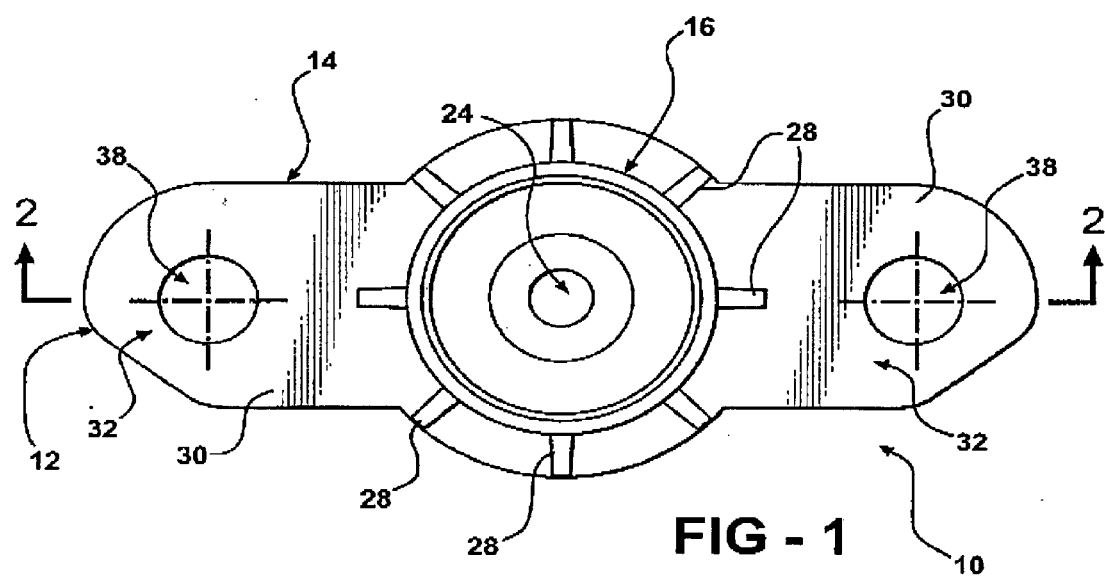
FIG. 1 is a plan view of a vehicle end gate hinge cup in accordance with the present invention.
Figure 2:
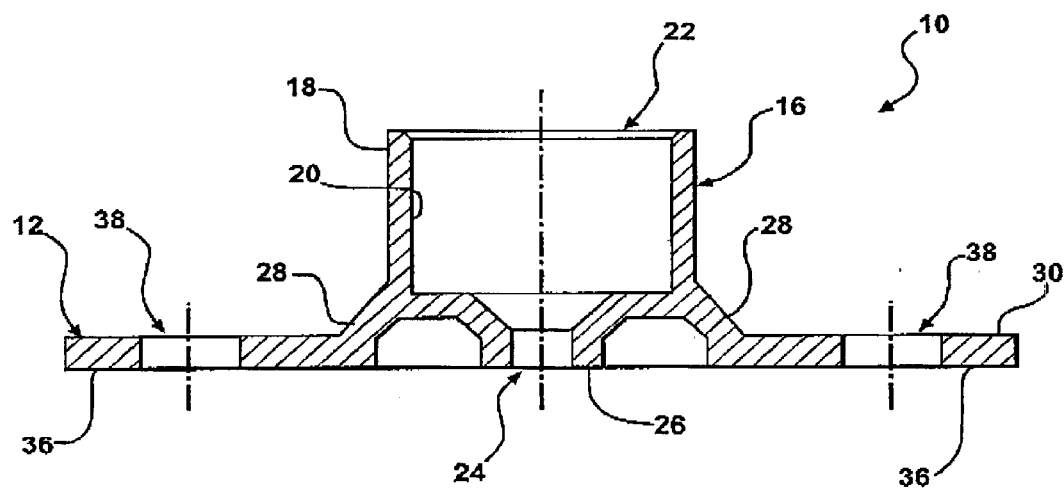
FIG. 2 is cross-sectional view taken along line 2—2 of the vehicle end gate hinge cup in FIG. 1.

Referring now to FIGS. 1 and 2, a hinge cup in accordance with the present invention is indicated generally at 10. The hinge cup 10 is adapted to be installed on an outer surface of a vehicle end gate (not shown). The hinge cup 10 includes a hinge cup body 12. The hinge cup body 12 is preferably constructed of a polymer material, such as Nylon 4–6 or a similar high strength polymer that has high compressive strength, excellent high and low temperature performance, and oil resistance properties. The hinge cup body 12 includes a bracket portion 14 that is integral with a cup portion 16.

Figure 5:
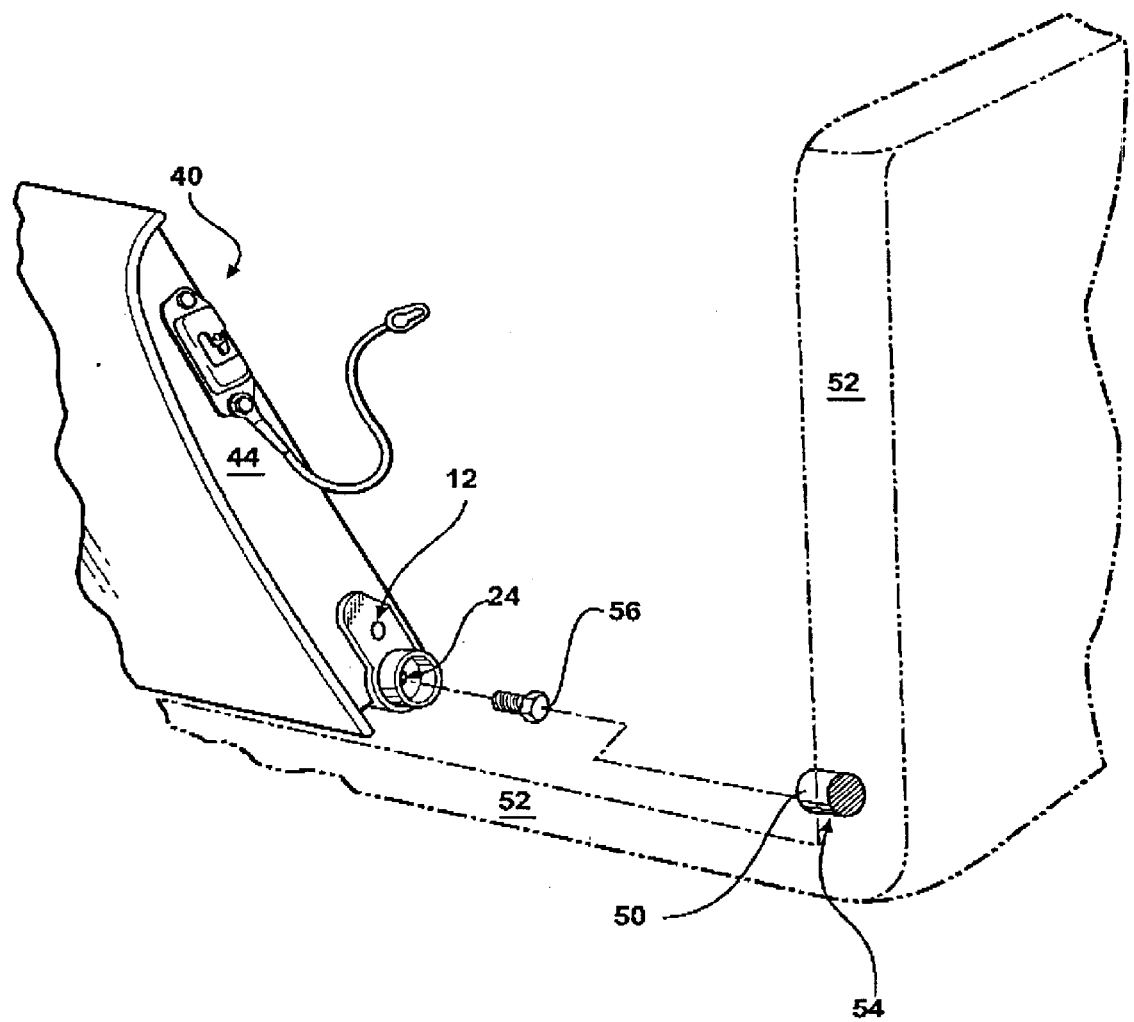
FIG. 5 is an exploded perspective view showing a portion of the end gate of FIG. 4 with a fastener and a portion of an end gate mounting location with a trunnion for cooperation with the hinge cup.

The cup portion 16 extends upwardly from the bracket portion 14 and is formed by an annular wall that includes an exterior wall surface 18 and an interior wall surface 20 that defines an aperture 22. The aperture 22 is adapted to receive a trunnion member, such as a trunnion member 50 shown in FIG. 5, that extends from a vehicle body, such as a vehicle body 52 shown in FIG. 5. A mounting aperture 24 extends through a lower wall 26 of the cup portion 16. The mounting aperture 24 is adapted to receive a fastener 56 shown in FIG. 5, such as a pin, a bolt, or the like, for attaching the hinge cup 10 to the outer surface of the vehicle end gate. The fastener 56 received in the mounting aperture 24 advantageously prevents the hinge cup 10 from moving relative to the vehicle end gate. A plurality of support members 28 extends from the exterior wall surface 18 to an upper surface 30 of the bracket portion 14 to provide support to the cap portion 16.

The bracket portion 14 includes two wing portions 32 each having the upper surface 30 and a lower surface 36 extending outwardly from the cup portion 16. Each wing portion 32 includes a mounting aperture 38 extending through the upper 30 and lower surface 36 thereof. Each mounting aperture 38 is adapted to receive a fastener (not shown) for mounting the hinge cup 10 to the outer surface of the vehicle end gate.

Figure 3:
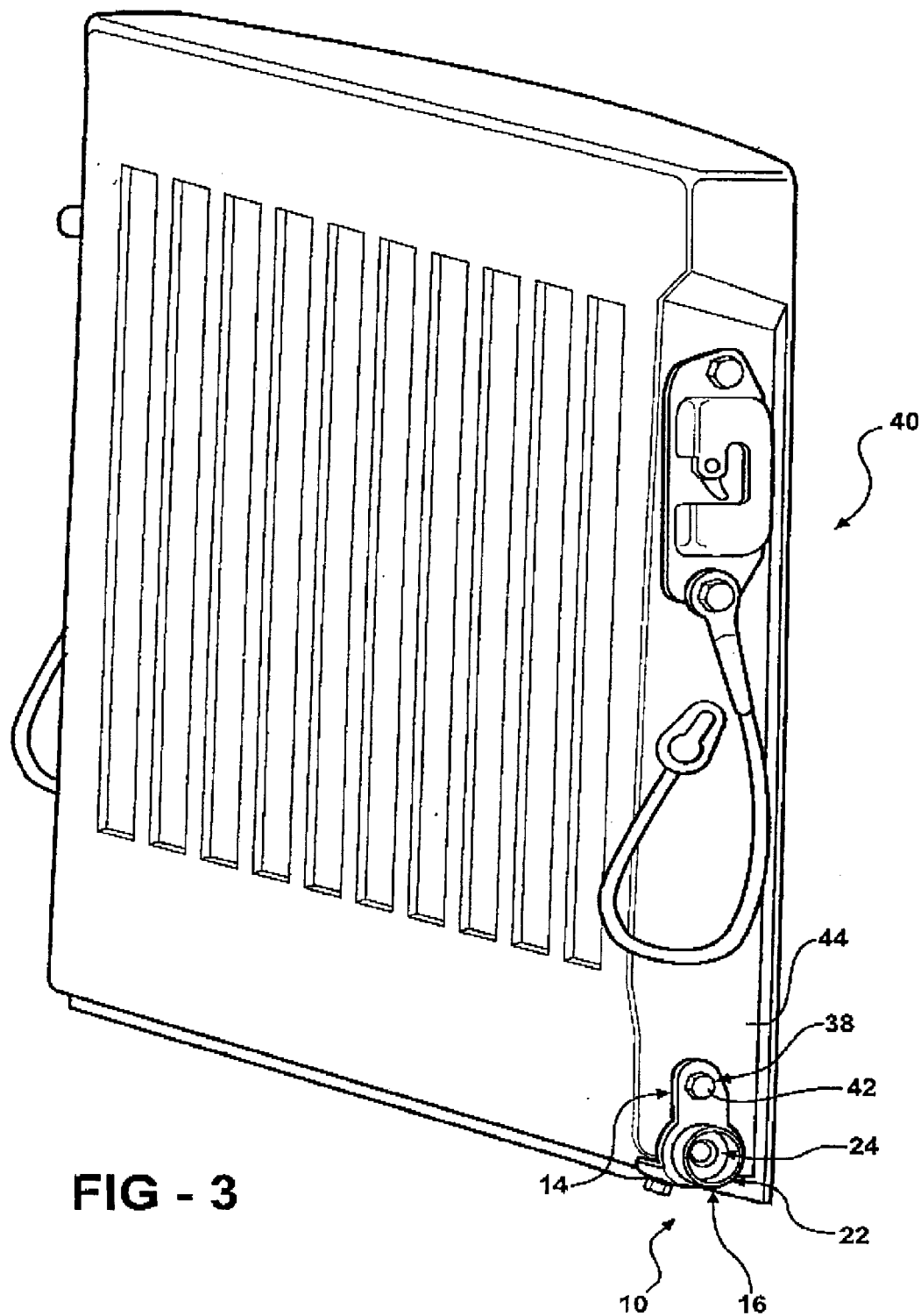
FIG. 3 is a side perspective view of a vehicle end gate hinge cup shown attached to a vehicle end gate.

Referring now to FIG. 3, the hinge cup 10 is shown attached to a vehicle end gate, indicated generally at 40. The vehicle end gate 40 is preferably adapted to be attached to a vehicle such as a pickup truck or the like. A fastener 42 such as a bolt, screw or the like, extends through the mounting aperture 38 to mount the bracket portion 14 to an outer surface 44 of a side of the vehicle end gate 40. A fastener, such as the fastener 56 shown in FIG. 5, extends through the mounting aperture 24 for mounting the cup portion 16 to the outer surface 44 of the vehicle end gate 40. The end gate 40 is preferably adapted to be attached to an end gate mounting location, such as an end gate mounting location 54 shown in FIG. 5, on the vehicle body 52. The end gate mounting location 54 on the vehicle body 52 includes the trunnion member 50 extending outwardly therefrom to cooperate with the aperture 22 of the cup portion 16 of the hinge cup 10 when the vehicle end gate 40 is placed adjacent the end gate mounting location 54 on the vehicle body 52.

Figure 4:
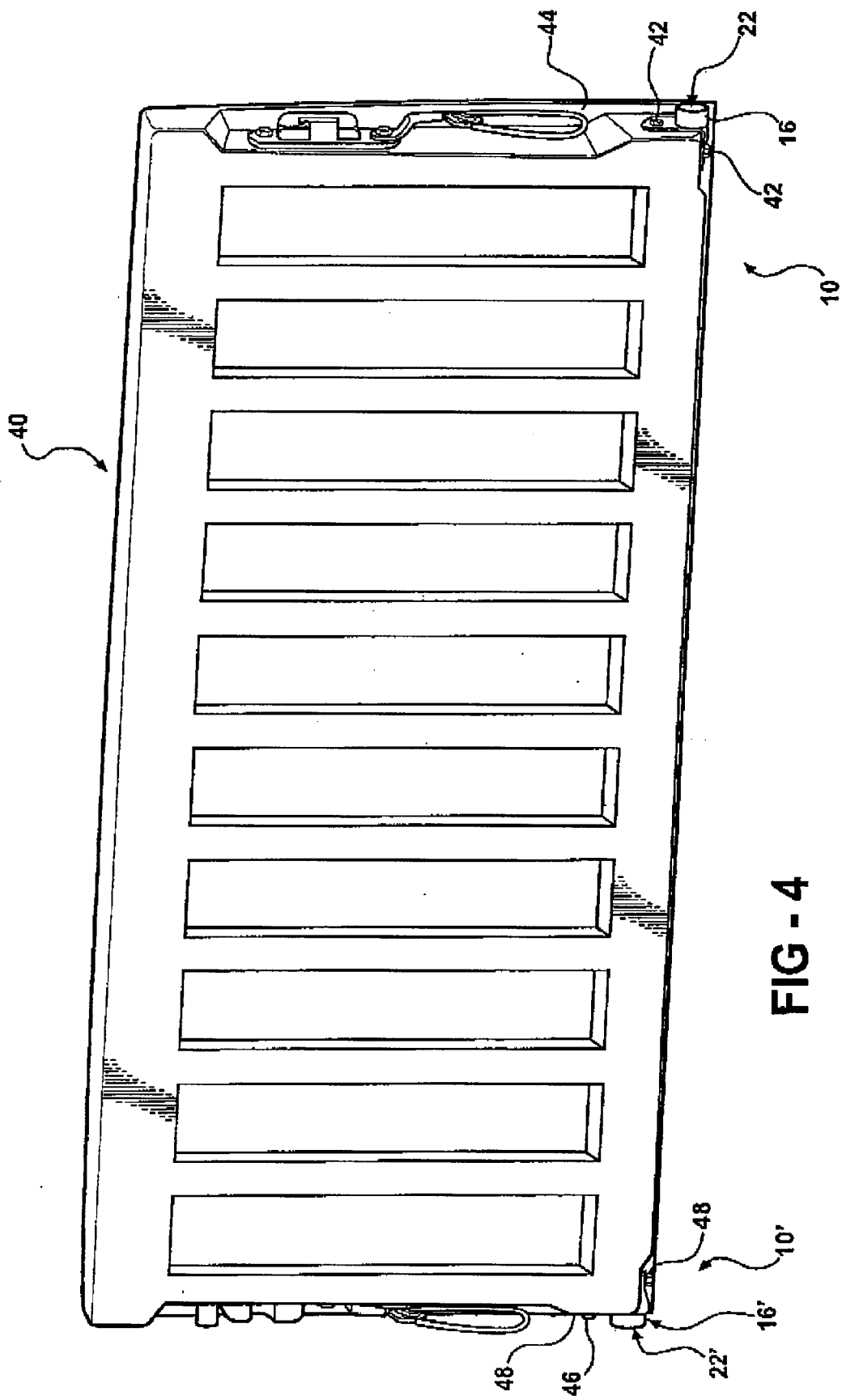
FIG. 4 is a front perspective view of the vehicle end gate hinge cup and vehicle end gate shown in FIG. 3.

Referring now to FIG. 4, the hinge cup 10 is shown mounted to the outer surface 44 by the fasteners 42 and another hinge cup 10' is shown mounting to an outer surface 46 on an opposite side of the vehicle end gate 40 by a plurality of fasteners 48. The hinge cups 10 and 10' are each adapted to receive a respective trunnion member, such as the trunnion member 50 shown in FIG. 5, extending outwardly from the vehicle body, such as the vehicle bode 52 shown in FIG. 5, to cooperate with the apertures 22 and 22', respectively, of the cup portions 16 and 16', respectively, in order to attach the vehicle end gate 40 to the end gate mounting location 54 on the vehicle body 52. preferred embodiment. However, it should be noted that the invention can be practiced otherwise than as specifically illustrated and described without departing from its spirit or scope.

What is claimed is:

1. A hinge cup adapted to be installed on an outer surface of a vehicle end gate, comprising:
    a one-piece hinge cup body constructed of a polymer material, said hinge cup body attached to a surface of a vehicle end gate and having an interior wall surface and a lower wall defining a trunnion receiving aperture operable to cooperate with a trunnion member extending outwardly from an end gate mounting location on a vehicle body, said hinge cup body having a mounting aperture extending through said lower wall, said mounting aperture adapted to receive a fastener therein for engaging the vehicle end gate and preventing movement of said hinge cup receiving aperture relative to the vehicle end gate,
    whereby said hinge cup body cooperates with the trunnion member when the end gate is placed adjacent the end gate mounting location on the vehicle body.

2. The hinge cup according to claim 1 wherein said polymer material is a high compressive strength polymer material.

3. The hinge cup according to claim 1 wherein said hinge cup body includes a bracket portion integral with a cup portion.

4. The hinge cup according to claim 3 wherein said bracket portion is adapted to be mounted on the vehicle end gate and said cup portion is formed by an annular wall that includes an exterior wall surface and said interior wall surface that defines said trunnion receiving aperture that is adapted to receive the trunnion member extending from the vehicle body.

5. The hinge cup according to claim 4 including a plurality of support members extending from said exterior wall surface of said cup portion to an upper surface of said bracket portion to provide support to said cup portion.

6. A hinge cup for engaging a trunnion to rotatably support a vehicle end gate, comprising:
    a one-piece hinge cup body formed of a polymer material including a bracket portion integral with a cup portion, said bracket portion being adapted to be mounted on a vehicle end gate and said cup portion being adapted to receive a trunnion member extending from a vehicle body, said cup portion of said hinge body defining a central mounting aperture extending therethrough, the mounting aperture adapted to receive a fastener therein for engaging the vehicle end gate and preventing said hinge cup body from moving relative to the vehicle end gate,
    whereby when said bracket portion is mounted on a vehicle end gate and said cup portion receives a free end of a trunnion member extending from a vehicle body, the end gate can be rotated about an axis of the trunnion member relative to the vehicle body.

7. The hinge cup according to claim 6 wherein said polymer material is a high compressive strength polymer material.

8. The hinge cup according to claim 6 wherein said cup portion is formed by an annular wall that includes an exterior wall surface and an interior wall surface, said interior wall surface receiving the trunnion.

9. The hinge cup according to claim 6 including a plurality of support members extending from said exterior wall surface of said cup portion to an upper surface of said bracket portion to provide support to said cup portion.

10. A vehicle end gate assembly adapted to be installed on an outer surface of a vehicle end gate, comprising:
    a vehicle end gate adapted to be attached to an end gate mounting location on a vehicle body;
    at least two hinge cup bodies constructed of a polymer material, said at least two hinge cup bodies each attached to opposing surfaces of said vehicle end gate and each having an interior surface operable to cooperate with a respective trunnion member extending outwardly from the end gate mounting location on the vehicle body, said at least two hinge cup bodies each defining a respective central mounting aperture extending therethrough, said mounting apertures each adapted to receive a fastener therein for engaging said vehicle end gate for preventing said hinge cup bodies from moving relative to said vehicle end gate;

whereby said at least two hinge cup bodies cooperate with the respective trunnion members when said end gate is placed adjacent the end gave mounting location on the vehicle body.

11. The vehicle end gate assembly according to claim 10 wherein said polymer material is a high compressive strength polymer material.

12. The vehicle end gate assembly according to claim 10 wherein said at least two hinge cup bodies include a bracket portion integral with a cup portion and each of said cup portions is formed by an annular wall that includes an exterior wall surface and an interior wall surface, said interior wall surface receiving the trunnion.

13. The vehicle end gate assembly according to claim 12 including a bracket portion integral with said cup portion.

14. The vehicle end gate assembly according to claim 13 including a plurality of support members extending from each said exterior wall surface of each said cup portion to an upper surface of each said bracket portion to provide support to said cup portion.

* * * * *